United States Patent
Said et al.

(10) Patent No.: US 9,830,138 B2
(45) Date of Patent: *Nov. 28, 2017

(54) CUSTOMER TAILORED RELEASE MASTER PLAN GENERATION FOR HYBRID NETWORKED SOLUTIONS

(71) Applicant: SAP SE, Walldorf (DE)

(72) Inventors: Bare Said, St. Leon (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,919

(22) Filed: Feb. 19, 2016

(65) Prior Publication Data
US 2016/0170732 A1    Jun. 16, 2016

Related U.S. Application Data

(63) Continuation of application No. 14/135,460, filed on Dec. 19, 2013, now Pat. No. 9,274,757.

(51) Int. Cl.
| | |
|---|---|
| *G06F 9/445* | (2006.01) |
| *G06Q 10/06* | (2012.01) |
| *G06F 9/44* | (2006.01) |
| *H04L 29/08* | (2006.01) |

(52) U.S. Cl.
CPC ............... *G06F 8/61* (2013.01); *G06F 8/30* (2013.01); *G06Q 10/06* (2013.01); *G06Q 10/0631* (2013.01); *G06Q 10/06316* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 5,838,973 | A * | 11/1998 | Carpenter-Smith | ...... G06F 8/34 345/418 |
| 7,966,278 | B1 * | 6/2011 | Satish | ...... G06F 8/61 706/52 |
| 8,751,573 | B2 * | 6/2014 | Said | ...... G06F 9/5072 709/204 |
| 9,170,798 | B2 * | 10/2015 | Nagaraja | ...... G06F 8/61 |
| 2005/0262503 | A1 * | 11/2005 | Kane | ...... G06F 8/61 717/176 |
| 2008/0288945 | A1 | 11/2008 | Tong et al. | |
| 2012/0239739 | A1 * | 9/2012 | Manglik | ...... G06F 9/5077 709/203 |
| 2012/0266156 | A1 * | 10/2012 | Spivak | ...... G06F 9/5055 717/172 |
| 2012/0291021 | A1 * | 11/2012 | Banerjee | ...... G06F 8/665 717/173 |
| 2013/0232245 | A1 | 9/2013 | Antosz et al. | |
| 2013/0232497 | A1 * | 9/2013 | Jalagam | ...... G06F 9/5072 718/104 |

(Continued)

*Primary Examiner* — Daxin Wu
(74) *Attorney, Agent, or Firm* — Mintz Levin Cohn Ferris Glovsky and Popeo, P.C.

(57) ABSTRACT

A business software customer deploying both on-premises and cloud-based applications can be provided with an automatically-generated, customer-tailored release master plan for a hybrid networked business solution that can include specific information and instructions tailored to the business software customer's customer-specific system landscape.

19 Claims, 7 Drawing Sheets

(56) References Cited

U.S. PATENT DOCUMENTS

2014/0082586 A1\* 3/2014 Casey ................... G06F 8/20
717/104
2014/0130036 A1\* 5/2014 Gurikar .................. G06F 8/61
717/176

\* cited by examiner

| Feature ID | NWS Name | Feature Type | Prerequisites | Configuration Steps /Actions |
|---|---|---|---|---|
| ID/1334 | NWS Core ERP + My People | Extension | Product Travel& Expense version 1.7 | Ref to configuration and release notes |
| ID/2222 | NWS Core ERP + Marketing professional package | enablement | Core ERP 2.0 | Ref to configuration and release notes |
| ... | ... | ... | ... | ... |

FIG. 5

*Header Metadata for release master plan*

| Product | Version | Deployment Model | Upgrade date | RTC date | New Features | | |
|---|---|---|---|---|---|---|---|
| | | | | | Name | | ID |
| Core ERP | 2.0 | On demand | 15.08.2013 | | External Interfaces | | ID/2346 |
| | | | | | Name | | ID |
| My CRM | 5.0 | On-Premise | ...... | 1.06.2013 | Campaign Management starter Pack | | ID/2222 |
| | | | | | ... | | |

*Lifecycle related feature details*

| Feature ID | Feature Name | Feature Category | | Availability Category | | Configuration Steps /Actions |
|---|---|---|---|---|---|---|
| | | Product | NWS | Immediate | configurable | |
| ID/2222 | Campaign Management professional package | | X | | X | Ref to product configuration and release notes |

*Networked solution specific metadata*

| Feature ID | NWS Name | Feature Type | Prerequisites | Configuration Steps /Actions |
|---|---|---|---|---|
| ID/2222 | NWS Core ERP + Marketing professional package | extension | Core ERP 2.0 | Ref to configuration and release notes |

CUSTOMER TAILORED RELEASE MASTER PLAN GENERATION FOR HYBRID NETWORKED SOLUTIONS

RELATED APPLICATION

This application is a continuation under 35 U.S.C. §120 of U.S. patent application Ser. No. 14/135,460 (which will issue as U.S. Pat. No. 9,274,757 on Mar. 1, 2016), filed Dec. 19, 2013, which is incorporated by reference herein in its entirety.

TECHNICAL FIELD

The subject matter described herein relates to approach for generating customer-specific release master plans for use with hybrid networked solutions.

BACKGROUND

Hybrid networked business solutions can allow an organization that purchases business software for use by employees, members, etc. of the organization (generally referred to herein as a business software customer) to access business applications offered via a software-as-a-service (e.g. cloud-based) approach as well as business applications supported by on-premises investments in business software systems by the business software customer. As used herein, the term "on-premises" refers to software installed and run on computers on the premises (e.g. at a facility owned or controlled by the business software customer) while the term "cloud-based" refers to software running on remote server computers, such as for example at a server facility or via one or more distributed computing facilities accessed over a wide area network such as the Internet. In general, a hybrid networked business solution approach includes integrating and combining business applications deployed on on-premises computing hardware with business applications offered as cloud-based products. Such an approach generally makes use of a hybrid deployment model, in which different business applications or components integrated into the hybrid networked business solution offering provided to users of the business software customer may be upgraded, updated, altered, etc. on differing timetables that are often not wholly under the control of the business software customer. In typical situations in which a business software customer offers a hybrid networked business solution in which an on-premises business application is integrated with one or more cloud-based BAs or vice versa, the complexity and efforts needed to operate and run such networked solutions can be significant and substantial.

For example, a business software customer can increasingly face challenges in managing its customer-specific system landscape that includes a complex set of interdependent business applications, particularly if the interdependent business applications include both on-premises solutions (typically under the control of the business software customer) and cloud-based solutions (typically not under the control of the business software customer). Such challenges can arise due to leveraging loosely coupled software products having different versions, different lifecycles, and different update and upgrade schedules. Knowing the impact or knowing the preparations needed for an upcoming product update can be quite difficult for the business software customer, especially when the customer can not influence the upgrade date decided by the software vendor (as may be the case for many cloud-based software products, for example).

SUMMARY

In some aspects of the current subject matter, a customer-tailored release master plan can be provided for a business software customer. The customer-tailored release master plan can be an interactive document that includes preparation steps to be performed to enable a new feature of a hybrid networked business solution that includes a cloud-based application and an on-premises business application, and can be generated based on a common release master plan, information characterizing the on-premises application of the business software customer, and a release master plan management object model, a customer-tailored release master plan for a hybrid networked business solution for the business software customer.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3, FIG. 4, and FIG. 5 show tables listing examples of metadata that can be sued as inputs to a customer-tailored release plan generated using an implementations of the current subject matter;

FIG. 6 shows a table illustrating an example of a customer-tailored release plan generated using an implementations of the current subject matter.

When practical, similar reference numbers denote similar structures, features, or elements.

DETAILED DESCRIPTION

Figure 1:
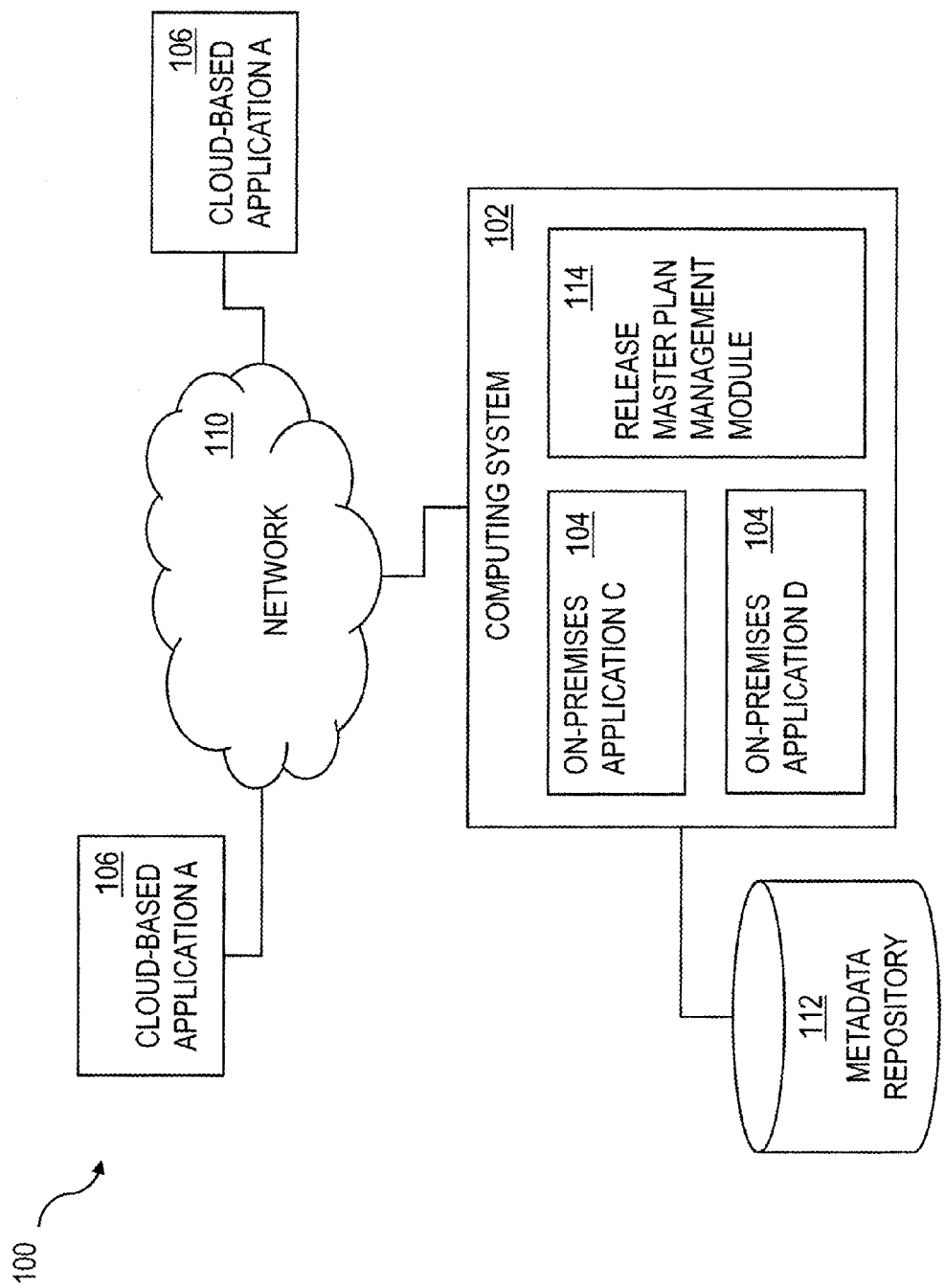
FIG. 1 shows a diagram illustrating aspects of a system arrangement illustrating features consistent with implementations of the current subject matter.

Approaches incorporating one or more features consistent with the descriptions provided herein can enable a business software customer having a customer-specific system landscape with hybrid solutions to easily manage the lifecycle of the different products, by providing the business software customer with specific information and instructions tailored to the customer-specific system landscape and to upcoming software changes. A customer-specific system landscape as used herein includes business applications accessible to users within a business software customer. The accessible business applications can be supported from on-premises servers (on premises applications or solutions) or other hardware or can be provided on-demand (e.g., as cloud-based applications solutions).

Consistent with implementations of the current subject matter, a least some complexity, requirement for human input into configuration and management of a hybrid networked business solution, and overall total cost of ownership of a hybrid networked business solution can be reduced. While approaches such as cloud solutions landscape directories; on-demand authorization management; shared resource discovery, configuration, and consumption for networked solutions can respectively address configuration of communication channels between networked solutions, user and authorization management across networked application, and reuse of resources, such approaches generally do not address the above-mentioned issues with product lifecycle management.

In general, a provider of cloud-based applications has a products release master plan specific to the cloud-based applications offered by the provider. This provider-specific products release master plan (also referred to as a common products release master plan), which a business software customer can in some examples access via a service provider cockpit, contains one or more of release dates (e.g. date at which an upgrade, update, hot fix, etc. of one or more cloud-based applications is set to occur), features to be included in an upcoming release, business scope extensions provided in the upcoming release, system (e.g. processor, network, memory, etc.) prerequisites for use of features of the upcoming release, preparations and actions needed by customers to enable a full set of features in an upcoming release. The term "service provider cockpit" is used herein to refer generically to an information source characterizing one or more aspects of a cloud-based application.

While information available from a service provider cockpit can be useful in helping a business software customer prepare for changes to a cloud-based application that may impact use of that particular application, a products release master plan for a cloud-based solution is typically customer independent or customer agnostic. In other words, a "one size fits all" approach has usually been applied due to a lack of an efficient approach to customizing such processes per business software customer. The provider-specific products release master plan generally cannot be used alone in automating configuration of other business applications that may have interdependencies on the application offered by different cloud service providers or that are managed on-premises by the business software customer.

Currently available lifecycle management systems for both on-premises and cloud-based business solutions generally offer tools for applying software changes determining dependencies between components and resolving conflicts in software sources during applying of changes and generally offer common static release information that is not tailored to a customer-specific system landscape. In other words, such a lifecycle management system typically can't provide a business software customer with tailored impact and instructions in advance. Additionally, such lifecycle management approaches are generally product specific (e.g. specific to one business application or perhaps multiple business applications provided by a same provider). These tools therefore generally fail to address one or more issues that can arise in a hybrid networked business solution that combines different products with different deployment models.

The current subject matter includes approaches that assist in automated generation of a customer-specific release master plan, which can be based on customer-specific system landscape information and provided to the business software customer. The generated release master plan can provide the customer with a concrete overview regarding upcoming changes to a specific application as well as impacts on other applications deployed in the customer-specific system landscape. The business software customer can also receive concrete instructions requiring execution either before or after software changes are applied.

FIG. 1 shows a diagram of components of a customer system landscape incorporating features consistent with implementations of the current subject matter. One or more computing systems 102 can be part of an on-premises software installation under the control of business software customer. The one or more computing systems 102 can execute one or more on-premises applications (labeled as applications C and D) 104. Users within or otherwise affiliated with the business software customer can also access one or more cloud-based applications 106, for example via a network 110, such as a wide area network, the Internet, etc. The one or more cloud-based applications can be provided by one service provider or by more than one service provider. Various features and functions of the on-premises applications 104 can also be supported by metadata retained in a metadata repository 112. A release master plan management module 114 or other comparable software functionality can optionally execute on the one or more on-premise computing systems as shown in FIG. 1 or itself be a cloud-based application accessible over the network 110 (or some other network). The release master plan management module 114 or some collection of comparable functionality, which can optionally be split between on-premises and cloud-based applications, can implement one or more features as described herein.

Figure 2:
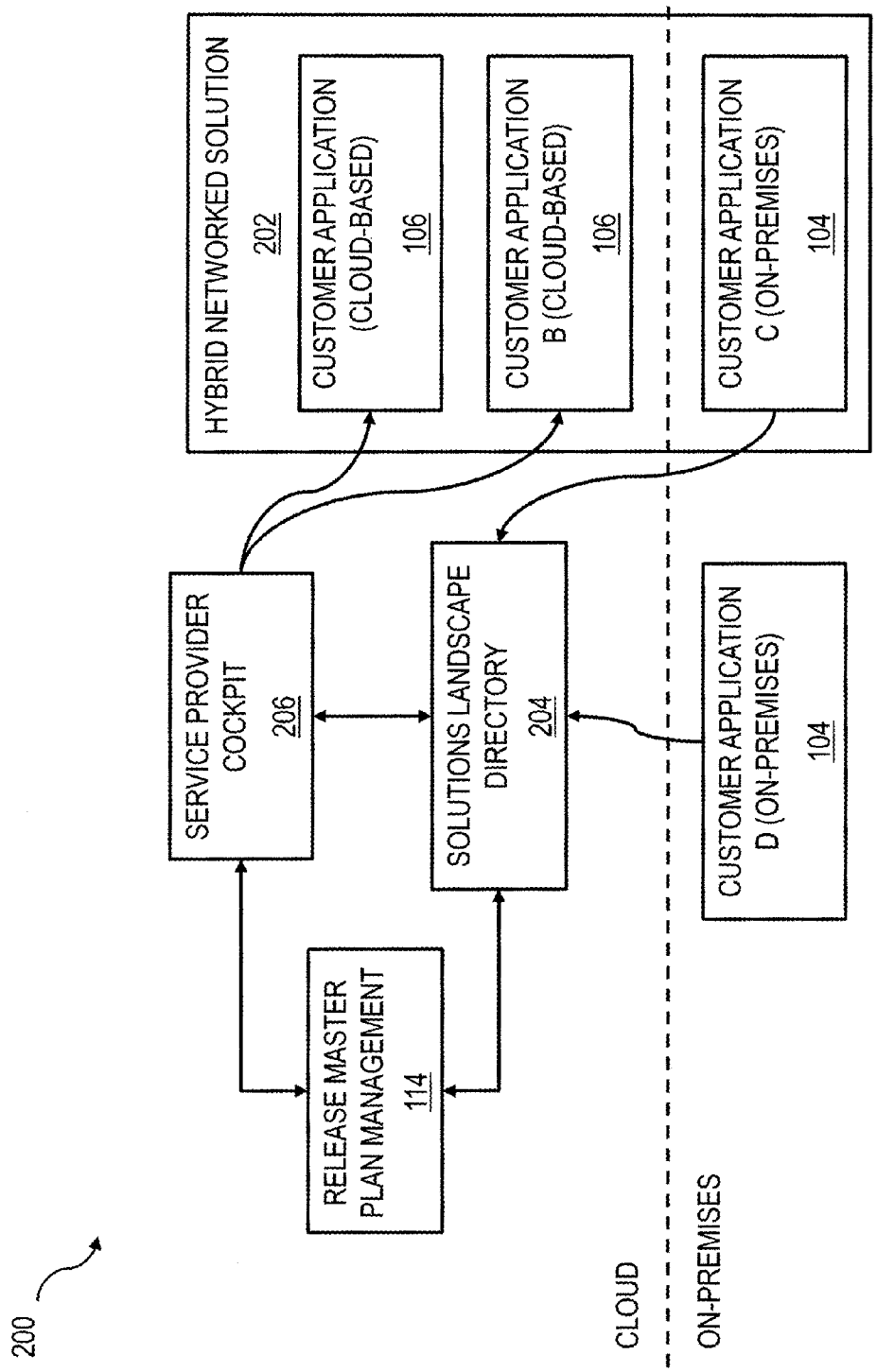
FIG. 2 shows a diagram illustrating additional features consistent with implementations of the current subject matter.

As shown in the diagram 200 of FIG. 2, a hybrid networked business solution 202 can include integration of one or more of the cloud-based applications 106 and one or more of the on-premises applications 104. A customer-specific system landscape directory 204 can include information characterizing the on-premises applications 104. In some examples, the business software customer's solutions landscape directory can also include some information about those cloud-based services available to (e.g., purchased by) the business software customer. A service provider cockpit 206 can include or provide information characterizing the one or more cloud-based applications 106 as described above. Each service provider providing a cloud-based application 106 can have a service provider cockpit 206.

Further with reference to FIG. 2, a service provider cockpit 206 can supply information about a common products release master plan for cloud-based applications 106 corresponding to that service provider cockpit 206. This information can include one or more of the details discussed above, for example a customer-specific upgrade or update date, which may differ by customer for large-scale cloud-based applications in which all servers of the cloud-based service provider are not upgraded simultaneously. The common products release master plan for the cloud-based applications 106 purchased or otherwise available to the business software customer can be accessed by the release master plan management module 114, which can run as standalone system, or alternatively be an integrated service in the system landscape directory, a cloud-based application, an application running on the on-premises equipment of the business software customer, etc.

The release master plan management module 114 can also access the business software customer's customer-specific system landscape directory 204 to obtain data about customer deployed products and customer systems (e.g., on-premises applications 104, cloud-based applications 106 supplied by different service providers, etc.). The release master plan management module 114 generates a customer-tailored release master plan by combining information provided by the common products release master plan, other information pulled from the service provider cockpit 206, and from business software customer's solutions landscape directory. The generated specific master plan can be provided as an interactive document, which the business software customer can have access to and monitor. Preparation steps and instructions can be also transformed or integrated with legacy components or system with task management capability.

The release master plan management module 114 can make use of a release master plan management object model, which can process and merge data originating from a common master plan object instance and from the service provider cockpit 206 with data pulled from a customer-specific system landscape directory. For each instance of the master plan object model and each business software customer, the release master plan management module 114 can thereby generate the customer-specific master plan containing information relevant to and adapted for the applications (cloud-based and on-premises) deployed by the business software customer.

Figure 3:
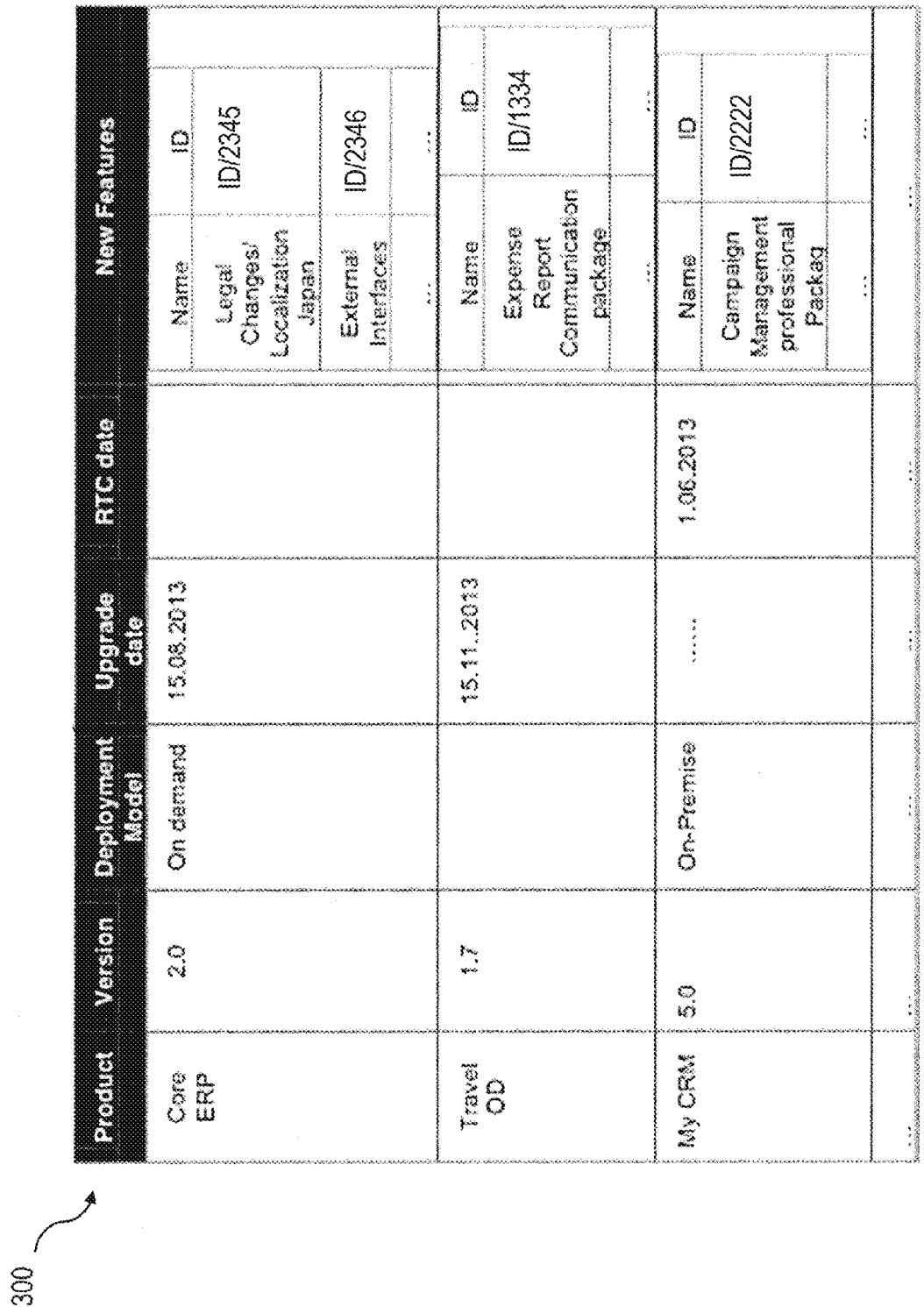
Figure 4:
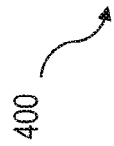

Examples of metadata that can be included in a release master plan management object model consistent with implementations of the current subject matter are described in the tables 300, 400, 500 of FIG. 3, FIG. 4, and FIG. 5, respectively, in reference to a fictitious example business software customer "Akron AG." FIG. 3 shows a table 300 illustrating header information of an example master plan. A master plan can be related to several products of a software vendor. For each product the following information is listed in FIG. 2: product version, deployment model, upgrade date, a "release-to-customer" (RTC) date, and list of new features.

The deployment model could be on-demand or on-premise. In an example in which an application or other software product is cloud-based (e.g., deployed on-demand), the upgrade date is relevant as the business software customer generally cannot influence this date. For on-premises application, the RTC date is relevant as the customer has the flexibility to decide when to upgrade to the newest product version (e.g., as soon as the new version is available or at some later time).

FIG. 4 shows a table 400 illustrating an example of metadata necessary to maintain lifecycle details for each feature of an example master plan. Each provided feature is uniquely identifiable across several products. Feature category indicates that the feature is restricted to the product itself and extends it in a standalone usage, or it indicates that the feature enables or extends a networked solution. New delivered products features may provide the necessary functionality to implement a networked solution composed of several products. The availability category indicates if a delivered feature is visible directly after upgrade/update or if there are some necessary steps needed to enable the use of the feature. Needed actions or steps are referenced in this case.

FIG. 5 shows a table 500 illustrating an example of metadata covering a networked solution. Further information about delivered features that can impact networked solutions can be provided in the master plan. Some features may provide the prerequisite for a product to be able to integrate with other products as a part of networked solution. Other features may provide a functional extension to an already existing networked solution. The "feature type" information can cover this type of information. The prerequisites information relates to other products versions needed to implement the networked solutions. Additionally, a list of actions or configuration steps can be referenced to enable or to extend a networked solution.

The information discussed in relation to the tables 300, 400, 500 provides an illustrative example of a software provider release master plan. Once the software provider publishes a common products release master plan, a customer specific master plan can be generated. The specific plan can be generated based on customer-specific system landscape information, which contains information about products, products version, physical systems, endpoints, business configuration, etc. used by or available to the business software customer. Based on that information, irrelevant products information can be removed (e.g., information related to not deployed products). In addition, a specific upgrade date for the customer can be updated (e.g., based on upgrade process information obtained from the service provider cockpit for a cloud-based application). Preparation steps and instructions and also new features availability and the availability date can be generated, such that the generated data are customer specific and related to current customer systems and configurations. Customer-specific networked solutions information can also be generated based on other products deployed by the business software customer (e.g. cloud-based solutions from other service providers, on-premises applications, etc.). Information about the customer-specific system landscape can be pulled from an on-premise system landscape directory (such as for example, SAP Solution Manager available from SAP SE of Walldorf, Germany), from an on-demand system landscape directory such as a cloud system landscape directory, or the like.

FIG. 6 shows a table 600 illustrating an example of a generated customer-tailored release plan for the example business software customer Akron AG. As shown, in the customer-tailored release plan, all information related to Travel & Expense Management is removed, as this product is not deployed by Akron AG. Also the legal change feature "ID/2345" is removed, as the Akron AG did not deploy the application "Core ERP" in Japan. The feature ID/2222 enables the business software customer to run a networked solution. Concrete administration and configuration steps are generated specifically to the Akron AG system landscape. The links to a "preparation and configurations" section of the generated master plan can present preparation steps and navigation links generated specifically in relation to Akron AG systems. For example, this section might include tasks to be completed such as applying a specific support package, with subtasks such as downloading one or more components from a service provider, uploading one or more components to a different service provider or to an on-premises server, etc. Other task can include activating a networked solution in a cloud system landscape directory, etc. The preparation and configurations sections can include links to further information, for downloading or uploading necessary components, etc.

Figure 7:
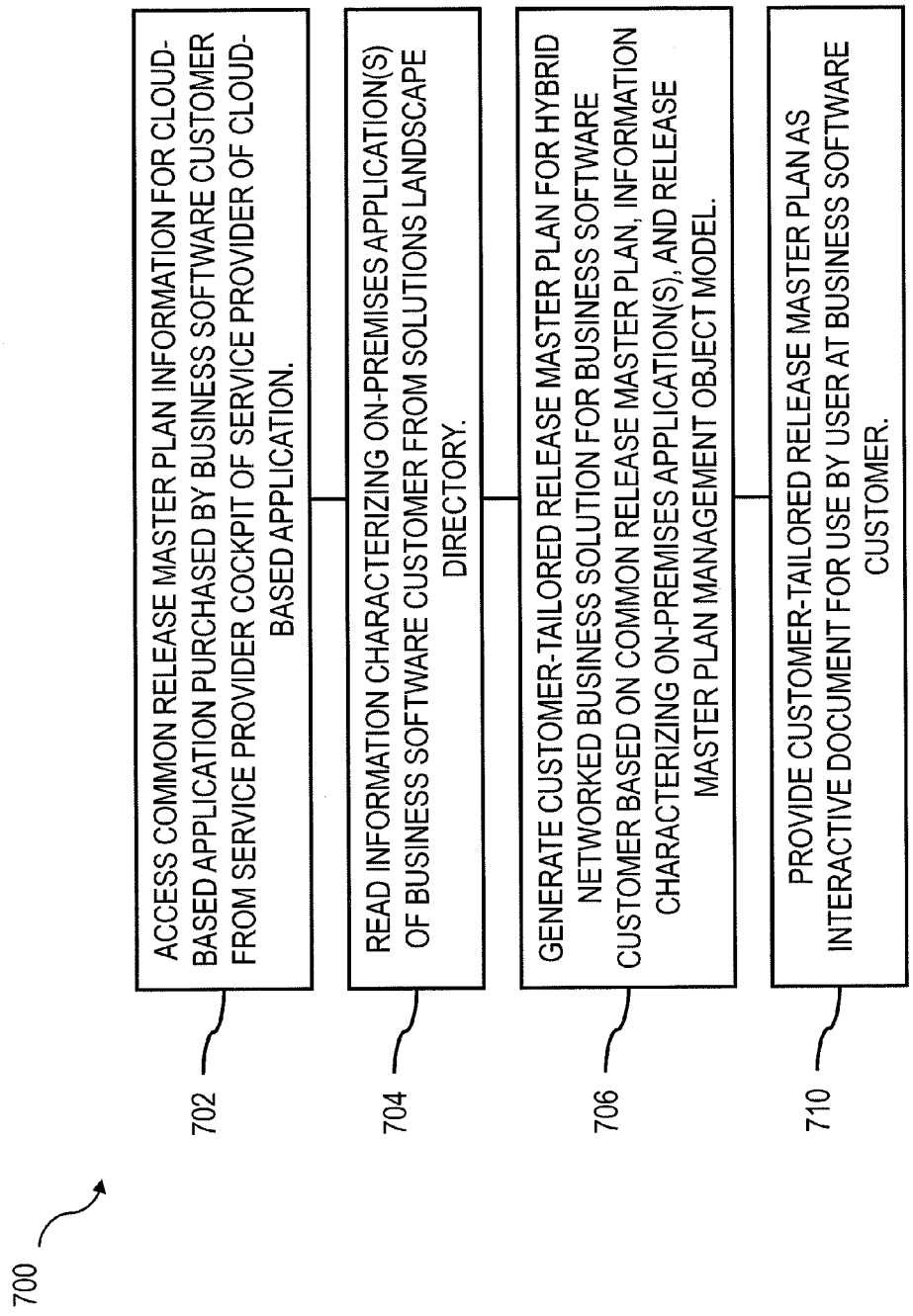
FIG. 7 shows a process flow diagram illustrating aspects of a method having one or more features consistent with implementations of the current subject matter.

FIG. 7 shows a process flow chart 700 illustrating features that can be included in a method consistent with implementations of the current subject matter. At 702, a release master plan management module 114 or other computer-based functionality accesses common release master plan information for a cloud-based application 106 purchased by a business software customer from a service provider cockpit 206 of a service provider of the cloud-based application. At 704, the release master plan management module 114 reads information characterizing one or more on-premises applications of the business software customer from a customer-specific system landscape directory 204. At 706, the release master plan management module 114 generates a customer-tailored release master plan for a hybrid networked business solution for the business software customer based at least on the common release master plan, the information characterizing the one or more on-premises applications of the business software customer, and a release master plan management object model. The customer-tailored release master plan is provided for use by a user at the business software customer as an interactive document that includes preparation steps to be performed to enable a new feature of the hybrid networked business solution.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

deploying a hybrid networked solution for a software customer, the hybrid networked solution integrating features of software running both on on-premises computing hardware and as cloud-based applications, the hybrid networked solution comprising an integration of a first application offered as a cloud-based product with a second application deployed on the on-premises computing hardware;

obtaining hybrid networked solution information and common product release master information, the hybrid networked solution information comprising identification of the first application and the second application and being obtained by accessing a customer-specific system landscape directory of the software customer, the common product release master information comprising a release date and prerequisites for customer use of one or more new features to be included in a new release of the first application;

processing and merging the obtained common product release master plan information and the hybrid networked solution information to create a release master plan for the hybrid networked solution, the release master plan detailing one or more preparation steps that must be performed to enable a new feature of the one or more new features to be added to the deployed hybrid networked solution for the software customer; and providing the release master plan for the software customer.

2. A computer program product as in claim 1, wherein the hybrid networked solution comprises an interdependency between the first application and the second application.

3. A computer program product as in claim 1, wherein the common product release master plan information further comprises at least one of a scope extension provided in the upcoming release, and a preparation and/or action needed to enable the feature.

4. A computer program product as in claim 1, wherein the processing and merging of the common product release master plan information and the hybrid networked solution information is performed by a release master plan management object model.

5. A computer program product as in claim 1, wherein the release master plan comprises an interactive document comprising a link.

6. A system comprising computer hardware configured to perform operations comprising:

deploying a hybrid networked solution for a software customer, the hybrid networked solution integrating features of software running both on on-premises computing hardware and as cloud-based applications, the hybrid networked solution comprising an integration of a first application offered as a cloud-based product with a second application deployed on the on-premises computing hardware;

obtaining hybrid networked solution information and common product release master information, the hybrid networked solution information comprising identification of the first application and the second application and being obtained by accessing a customer-specific system landscape directory of the software customer, the common product release master information comprising a release date and prerequisites for customer use of one or more new features to be included in a new release of the first application;

processing and merging the obtained common product release master plan information and the hybrid networked solution information to create a release master plan for the hybrid networked solution, the release master plan detailing one or more preparation steps that must be performed to enable a new feature of the one or more new features to be added to the deployed hybrid networked solution for the software customer; and providing the release master plan for the software customer.

7. A system as in claim 6, wherein the hybrid networked solution comprises an interdependency between the first application and the second application.

8. A system as in claim 6, wherein the common product release master plan information further comprises at least one of a scope extension provided in the upcoming release, and a preparation and/or action needed to enable the feature.

9. A system as in claim 6, wherein the processing and merging of the common product release master plan information and the hybrid networked solution information is performed by a release master plan management object model.

10. A system as in claim 6, wherein the release master plan comprises an interactive document comprising a link.

11. A computer-implemented method comprising:

deploying a hybrid networked solution for a software customer, the hybrid networked solution integrating features of software running both on on-premises computing hardware and as cloud-based applications, the hybrid networked solution comprising an integration of a first application offered as a cloud-based product with a second application deployed on the on-premises computing hardware;

obtaining hybrid networked solution information and common product release master information, the hybrid networked solution information comprising identification of the first application and the second application and being obtained by accessing a customer-specific system landscape directory of the software customer, the common product release master information comprising a release date and prerequisites for customer use of one or more new features to be included in a new release of the first application;

processing and merging the obtained common product release master plan information and the hybrid networked solution information to create a release master plan for the hybrid networked solution, the release master plan detailing one or more preparation steps that must be performed to enable a new feature of the one or more new features to be added to the deployed hybrid networked solution for the software customer; and providing the release master plan for the software customer.

12. A computer-implemented method as in claim 11, wherein the hybrid networked solution comprises an interdependency between the first application and the second application.

13. A computer-implemented method as in claim 11, wherein the common product release master plan information further comprises at least one of a scope extension provided in the upcoming release, and a preparation and/or action needed to enable the feature.

14. A computer-implemented method as in claim 11, wherein the processing and merging of the common product release master plan information and the hybrid networked solution information is performed by a release master plan management object model.

15. A computer-implemented method as in claim 11, wherein the deploying, the obtaining, the processing and merging, and the providing are performed by at least one system comprising computing hardware.

16. A computer-implemented method as in claim 11, wherein the release master plan comprises is an interactive document comprising a link.

17. A computer program product as in claim 1, wherein the first application and the second application having different versions, different lifecycles, and different update and upgrade schedules.

18. A computer program product as in claim 1, wherein the common product release master information is obtained from a provider of the first application.

19. A computer program product as in claim 1, wherein the release master plan comprises a link enabling downloading or uploading of one or more components necessary for enabling the new feature.

\* \* \* \* \*